(12) United States Patent
Nakajima (10) Patent No.: US 8,368,904 B2
(45) Date of Patent: Feb. 5, 2013

(54) IMAGE FORMING DEVICE (75) Inventor: Kouki Nakajima, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 1251 days.

(21) Appl. No.: 11/805,652

(22) Filed: May 24, 2007

(65) Prior Publication Data

US 2007/0273911 A1 Nov. 29, 2007

(30) Foreign Application Priority Data

May 26, 2006 (JP) ................................. 2006-147303

(51) Int. Cl.
*G06F 15/00* (2006.01)
(52) U.S. Cl. ........................ 358/1.13; 358/1.15; 715/760
(58) Field of Classification Search .................. 358/1.13; 715/760
See application file for complete search history.

(56) References Cited

U.S. PATENT DOCUMENTS

| 5,684,970 | A  | * | 11/1997 | Asuma et al. .................. 715/775 |
| 7,275,213 | B2 | * | 9/2007  | Katano .......................... 715/744 |
| 7,665,029 | B2 | * | 2/2010  | Nakajima ....................... 715/771 |
| 2002/0181777 | A1 | * | 12/2002 | Sumikawa et al. ........... 382/202 |
| 2003/0011633 | A1 | * | 1/2003  | Conley et al. ................. 345/762 |
| 2003/0226885 | A1 | * | 12/2003 | Harris ............................ 235/375 |
| 2005/0046887 | A1 | * | 3/2005  | Shibata et al. ................ 358/1.13 |
| 2005/0071738 | A1 | * | 3/2005  | Park et al. ..................... 715/500 |
| 2005/0185204 | A1 | * | 8/2005  | Shelton et al. ................ 358/1.13 |
| 2006/0259499 | A1 | * | 11/2006 | Moulckers et al. ........... 707/100 |
| 2006/0262349 | A1 | * | 11/2006 | Moroi ........................... 358/1.15 |
| 2007/0055976 | A1 | * | 3/2007  | Ward et al. .................... 719/329 |
| 2007/0157096 | A1 | * | 7/2007  | Keren et al. ................... 715/760 |
| 2007/0168975 | A1 | * | 7/2007  | Kessler ......................... 717/124 |
| 2009/0006992 | A1 | * | 1/2009  | Gilboa .......................... 715/763 |
| 2009/0204914 | A1 | * | 8/2009  | King et al. .................... 715/763 |

FOREIGN PATENT DOCUMENTS

| EP | 0632 637     | 1/1995  |
| JP | s 63-41 929  | 2/1988  |
| JP | s 63-300 320 | 12/1988 |
| JP | h 06-282 427 | 10/1994 |
| JP | 2005 80019   | 3/2005  |

OTHER PUBLICATIONS

Machine translation of Japanese Patent Document No. 06-282427, Oct. 7, 1994, Murazaki Yasushi.*

* cited by examiner

*Primary Examiner* — David K Moore
*Assistant Examiner* — Mark Milia (57) ABSTRACT

A method for providing an image forming device with a user-friendly application program. A program of the image forming device includes a basic service program and a simple text language processing program. The basic service program has an operation panel control module, image input and image output modules. If a command string in a source code is a control string, the simple text language processing program passes a parameter of a button description included in the control string to the operation panel control module as an argument to cause a button to be displayed and pressing of the button when pressed. In response to the detection, corresponding modules are activated. Accordingly, different multiple modules can be easily processed. Additionally, any size of buttons can be displayed anywhere on the panel. The image forming device alone can realize the method to allow many more users to easily use the application.

9 Claims, 7 Drawing Sheets

```
!START!
SAVE
If botton 200,60,60,40 Submit Invoice is pushed then{
  SCAN ;
  FAX = Address Book (Acct Dept) ;
  E-MAIL = Address Book (John Smith) ;
}
!END!
```

```
!START!
SAVE
If botton 200,60,60,40 Submit Invoice is pushed then{
  SCAN ;
  FAX = Address Book (Acct Dept) ;
  PDF;
  E- MAIL = Address Book (John Smith) ;
}
!END!
```

FIG. 7

IMAGE FORMING DEVICE

FIELD OF THE INVENTION

The present invention relates to an image forming device having an image input unit for reading a document image, receiving image data, and reading out image data from a memory area and an image output unit for forming an image on a paper, transmitting image data, and storing image data into the memory area.

The present invention particularly relates to an image forming device with a simple text language processing program installed for executing interpretation of a user application program.

BACKGROUND OF THE INVENTION

An image forming device, especially a MFP has been further developed to offer the user more functions to meet a variety of needs by the user.

Multi-functionalization of image forming devices, however, complicates a menu design by increasing menu items and lowers usability. More specifically, the multi-functionalization increases functions unnecessary to the user, along with more buttons for the user to press in order to execute a function. Such complicated procedure naturally lowers the usability.

To address this issue, Japanese Application Laid-Open No. 2005-80019 discloses a method of writing a command combining a plurality of operations in the XML language and executing it.

Nevertheless, the method accompanies an execution of a processing unparallel to the operation panel, so that the user unfamiliar with programming will experience inconvenience.

SUMMARY OF THE INVENTION

An object of the present invention is to address such issues by providing an image forming device which enables the user to easily use a user application program for the image forming device.

According to the first aspect of an image forming device of the present invention, the image forming device includes a processor, a storage unit storing a program, an operation panel, an image input unit, and an image output unit. The image input unit reads a document image, receives image data, and reads image data from a memory area. The image output unit forms an image on a paper, transmits image data, and stores image data into the memory area. The storage unit, the operation panel, the image input unit, and the image output unit are connected to the processor. The program is constituted of a service program and a text language processing program.

The service program has an operational panel control module, image input module, and image output module. The operation panel control module manages display of a button on the display panel and detection of a pressing operation of the button. The input module manages operation of the image input unit for it to acquire image data. The image output module manages provision of the image data to the image output unit.

If a command string included in the source code is a control string, the simple text language processing program passes a parameter of a button description included in the control string as an argument to the operation panel control module to direct the processor to display a button on an operation panel and detect pressing of the button when pressed. In response to the detection, the simple text language processing program activates modules among the image input and the image output modules, which correspond to an image input processing command string and an image output processing command string included in the source code, following the control string.

As a second aspect of an image forming device of the present invention, according to the first aspect, the parameter of the button description includes a position coordinate and a size of the button on a display screen of the operation panel.

As a third aspect of an image forming device of the present invention, according to the first aspect, the basic service program further includes an OCR (Optical Character Recognition) module. Also, the program further includes a preprocessing program. The preprocessing program activates the image input module. The image input module directs the image input unit to read a document image thereby acquire image data. The preprocessing program also activates the OCR module. The OCR module acquires the source code of the user application by recognizing characters included in the image data.

Accordingly, the present invention allows function modules according to an operation button to be easily combined, and thus, more users can easily use an application program. Furthermore, any desired size of a button can be placed on a desired location without a difficulty. Yet furthermore, such configuration achieves improving usability of the user application with an image forming device alone.

These and other objects, features and advantages of the present invention are specifically set forth in or will become apparent from the following detailed descriptions of the invention when read in conjunction with the accompanying drawings.

DETAILED DESCRIPTION OF THE INVENTION

Exemplary embodiments of the present invention are explained below with reference to the accompanying drawings though these embodiments are not intended to limit the invention. Additionally, in some instances, well-known structures, interfaces, and processes have not been shown in detail in order not to unnecessarily obscure the present invention.

According to a configuration of the first aspect of the present invention, if a command string included in the source code is a control string, the parameter of the button description included in the control string is passed to the operation panel control module as an argument, which causes the button to be displayed on the operation panel and the pressing operation of the button to be detected when pressed. In response to the detection, modules among the image input and the image output modules, which correspond to an image input process command and an image output process command strings included in the source code, following the control string will be activated. Thus, function modules according to the operation button can be easily combined, thereby more user can easily use the application program.

According to a configuration of the second aspect of the present invention, the parameter of the button description includes the position coordinate and the size of the button on the display screen of the operation panel. Therefore, any desired size of a button can be easily placed on a desired location.

According to a third aspect of an image forming device of the present invention, the image input module is activated to direct the image input unit to read a document image thereby acquire image data. Additionally, the OCR module is activated to acquire the source code of the user application by recognizing characters included in the image data. Therefore, the configuration can improve usability of the user application solely with an image forming device.

Figure 1:
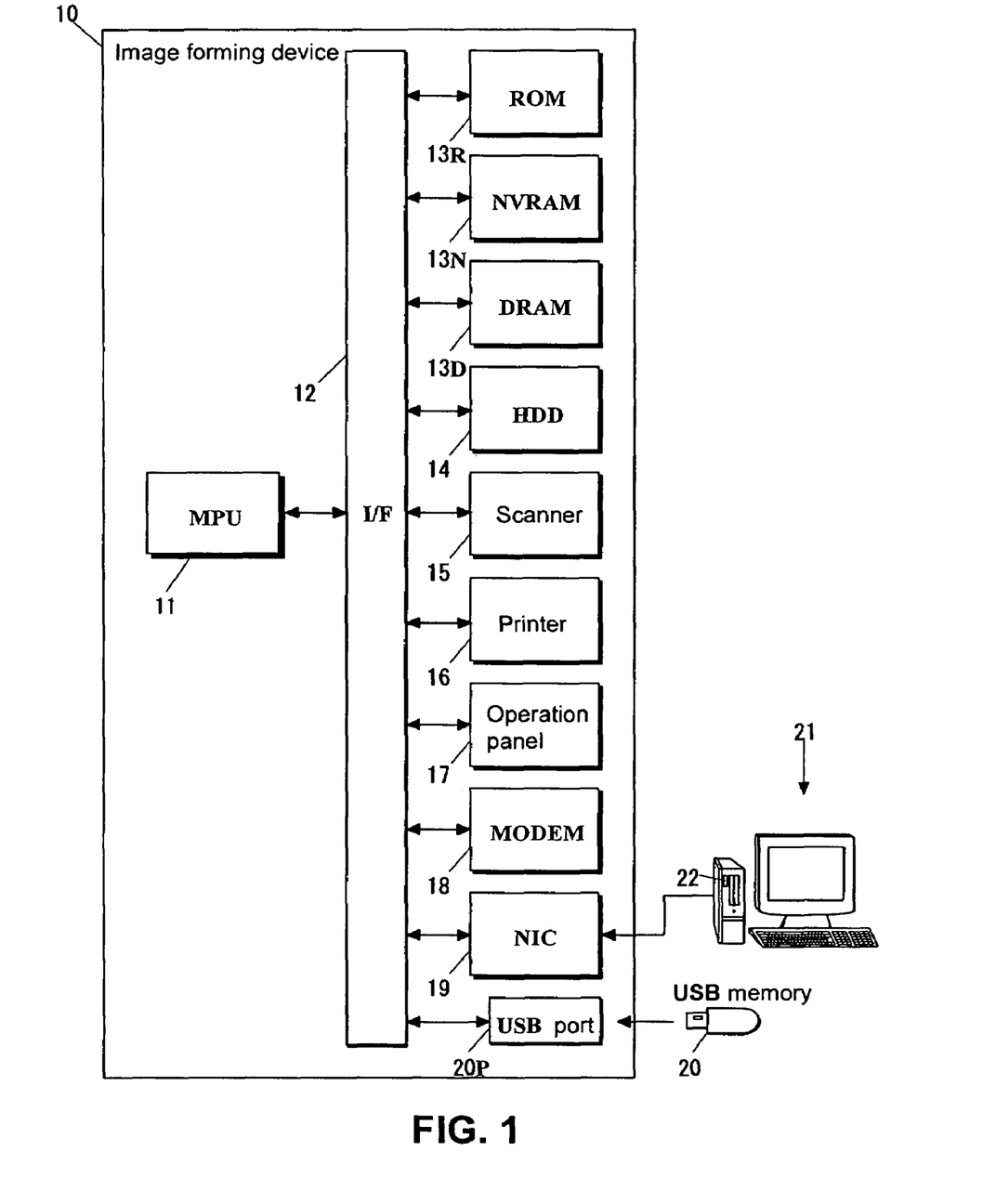
FIG. 1 is a schematic block diagram illustrating a hardware configuration of an image forming device of a preferred embodiment of the present invention.

FIG. 1 is a schematic block diagram illustrating a hardware configuration of an image forming device 10 of a preferred embodiment of the present invention.

Figure 2:
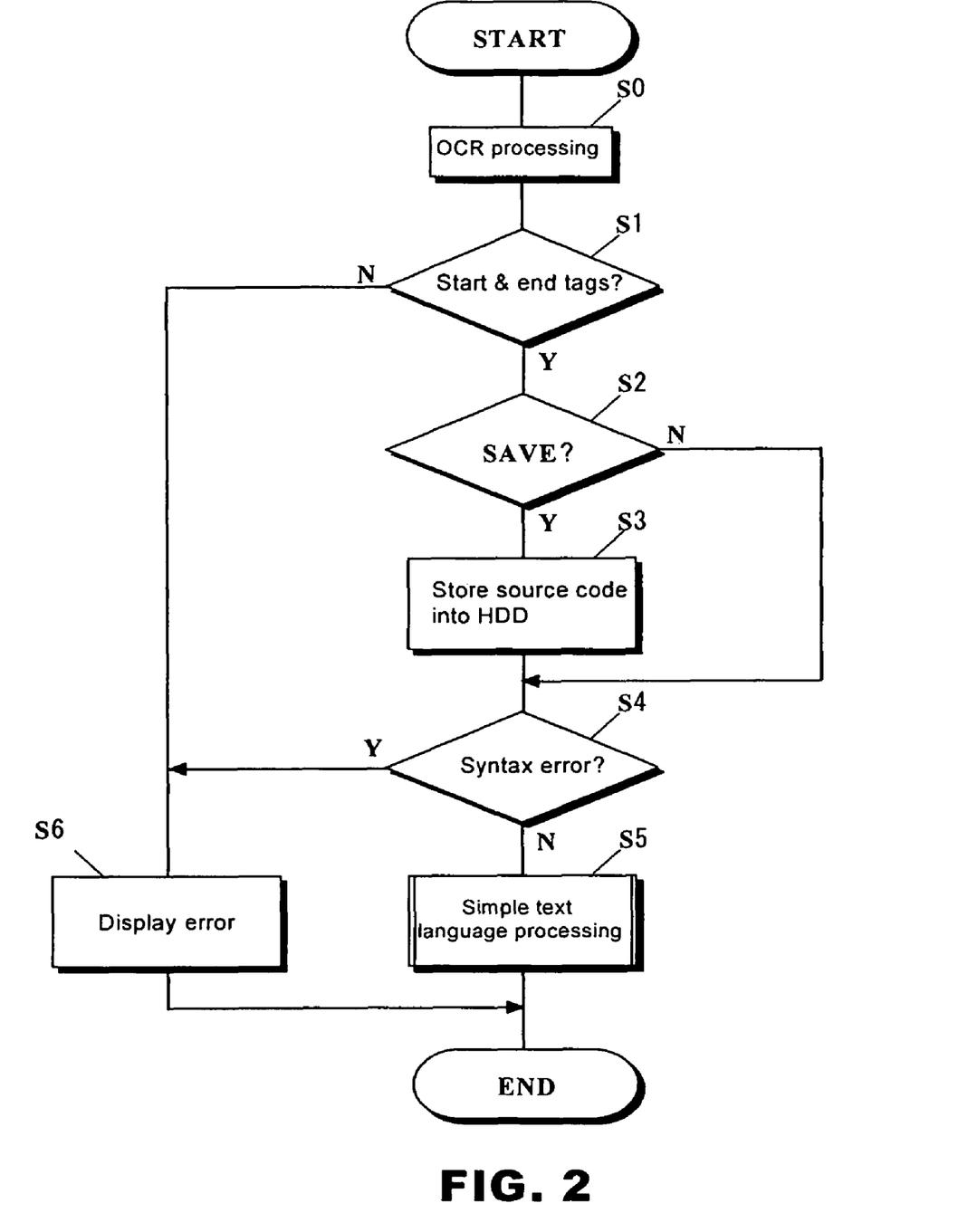
FIG. 2 is a schematic flowchart indicating a processing performed by a preprocessing program and a simple text language processing program of the present invention.

The image forming device 10 includes a MPU (microprocessor unit) 11. The MPU 11 is connected through an interface 12 individually to a ROM 13R, a NVRAM (Non-Volatile Random Access Memory) 13N, a DRAM (Dynamic Random Access Memory) 13D, a HDD (Hard Disk Drive) 14, a scanner 15, a printer 16, an operation panel 17, a MODEM (modulator/demodulator) 18, a NIC (Network Interface Card) 19, and a USB (Universal Serial Bus) port 20P. FIG. 2 simplifies a configuration of the interface 12 having multiple interfaces by illustrating it with one single block. The interface 12 includes a USB interface.

A ROM (Read only Memory) 13R stores a bootstrap and BIOS. The NVRAM 13N includes a flash memory and the like and stores an OS (operating system) 30, an application which operates on the layer higher than that of the OS 30, and each type of device drivers which operate on the layer below that of the OS 30 and configuration values for the drivers. The application makes the image forming device 10 function as a MFP having copying, scanning, printing, FAX (facsimile), and other functions. The HDD 14 is a data storage. The DRAM 13D provides a work area.

The scanner 15 is an image input unit for copying and FAX transmission. The printer 16 has a printer engine, a fuser unit, a paper input unit, a paper transfer unit, and a paper output unit. The printer 16 forms an electrostatic latent image, based on bitmap data provided as print data, on a photo conductive drum of the printer engine, develops the image with a toner, transfers and fuses the developed image onto a paper, and ejects the paper. The operational panel 17 includes a display unit and a key input unit and used for inputting configuration information or an instruction and displaying a selection screen, a configuration screen, and others. The MODEM 18 is used for FAX transmission and reception. The NIC 19 is connected to a host computer on a network to be used for a print job. A USB memory 20 connected to the USB port 20P has, for example, a flash memory chip.

Figure 3:
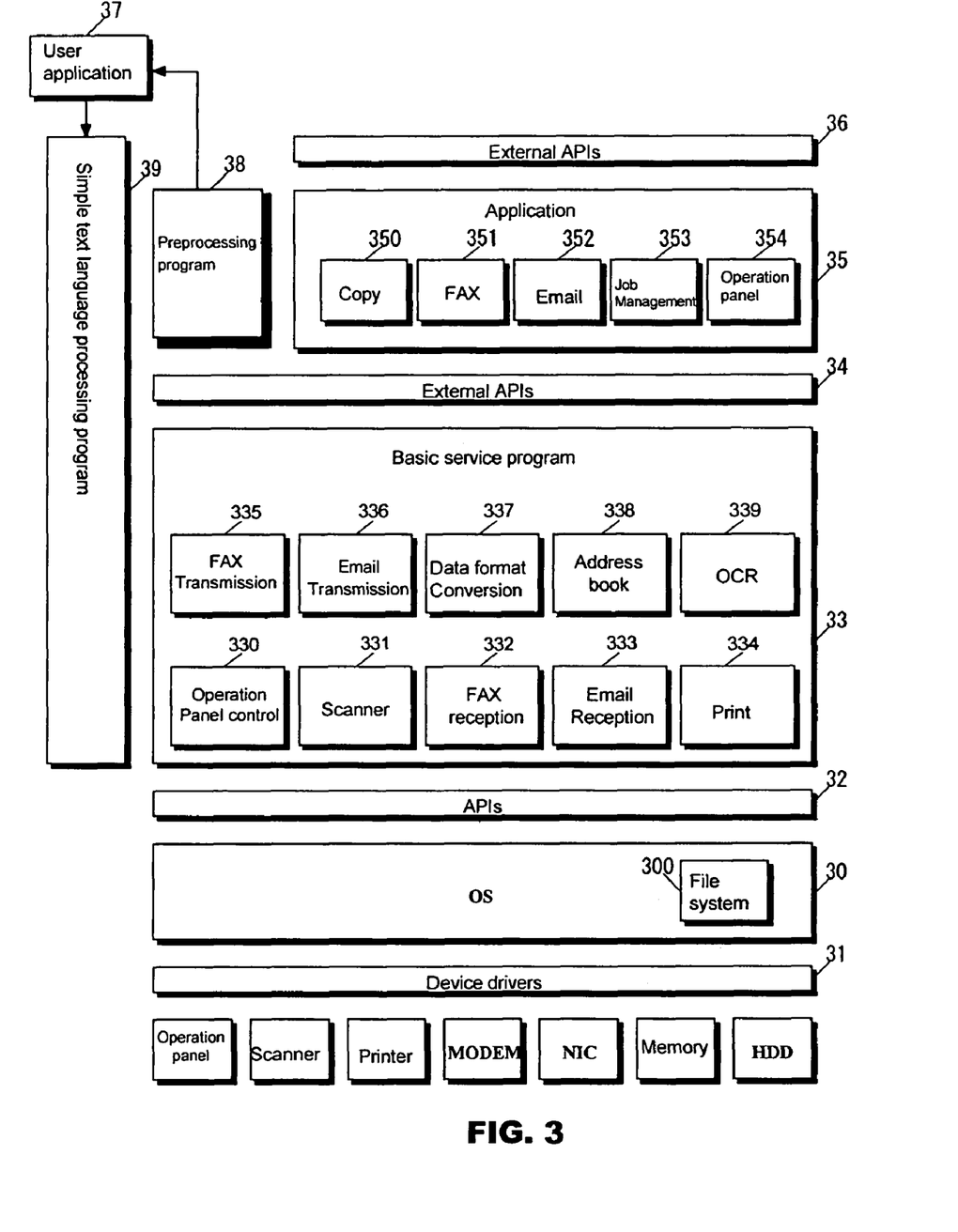
FIG. 3 is a schematic block diagram illustrating a software layer structure of a preferred embodiment of the present invention.

FIG. 3 is a schematic block diagram illustrating a software layer configuration of an image forming device of a preferred embodiment of the present invention.

Device drivers 31 are installed on the layer below that of the OS 30. Each driver included in the device drivers 31 correspond to each type of hardware.

A basic service program 33 is provided on the layer above that of the OS 30. The basic service program 33 uses each type of functions included in the OS 30 through APIs (Application Program Interfaces) 32. The APIs 32 help the basic service program 33 use the aforementioned functions. The basic service program 33 includes an operation panel control module 330, an image input module, a data processing module for processing image data acquired with the image input module, and an image output module for outputting the processed image data.

The operation panel control module 330 manages display of an operation button on the operation panel 17 and a detection of pressing of the button when pressed by the user.

The image input modules include a scanner module 331, a FAX reception module 332, and an email reception module 333. The image output modules include a print module 334, a FAX transmission module 335, and an email transmission module 336. The data processing modules include a data format conversion module 337 for converting a format of image data, a module for processing for including multiple pages per page (not shown), and a module for adding page numbers.

The basic service program 33 further includes utility modules. The utility modules are an address book module 338 for designating a recipient and an OCR module 339 for recognizing a program (source code) written on a paper. Each module constituting the basic service program 33 uses functions of the OS 30 through the APIs 32.

An application 35 is provided on the layer above that of the basic service program 33. The external API 34 is placed in between the application 35 and the basic service program 33.

The application 35 is provided by a vender and includes a copy program 350, a FAX program 351, an email program 352, a job management program 353, and an operation panel program 354.

The programs 350 though 354 can be configured as a single integrated application or individual applications.

The application 35 is a program created with modules of the basic service program 33 through external APIs 34. For example, the copy program 350 is configured with a combination of the scanner module 331 and the print module 334. Alternatively, the FAX program 351 is configured with a combination of the FAX reception module 332, the FAX transmission module 335, and the address book module 338.

External APIs 36 are provided on the layer immediately above that of the application 35. The external APIs 36 use each type of functions of the application 35. Additionally, a preprocessing program 38 is installed on the same layer as that of the application 35.

The preprocessing program 38 generates a source code (text) from characters printed or written on a paper. The preprocessing program 38 is a program that uses the scanner module 331 and the OCR module 339 through corresponding APIs among the other external APIs 34. It is apparent to any skilled person that the preprocessing program 38 can be also configured in a way that it does not use the scanner module 331 when the OCR module 339 calls the scanner module 331.

The software of the image forming device 10 further include a simple text language processing program 39 which is an interpreter for a user application 37. The program 39 executes the user application 37 by interpreting a command string of the user application 37 to use a program included in the basic service program 33 through the external APIs 34 or the application 35 through the external APIs 36. In this respect, the application 35 is an application service program for the simple text language processing program 39.

Figure 4A:
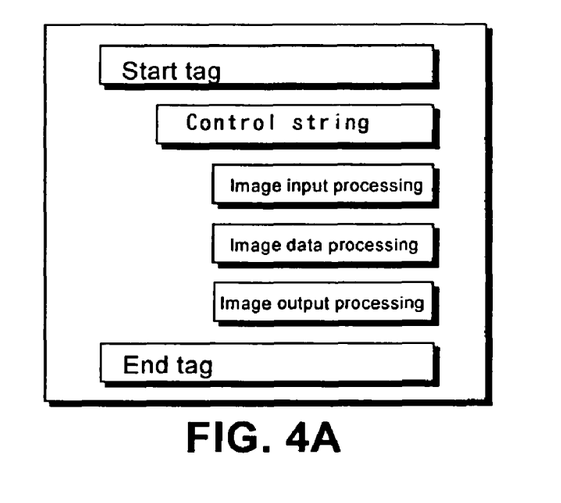
FIG. 4A is a description diagram indicating a syntax of a simple text language processing program of the present invention.
Figure 4B:
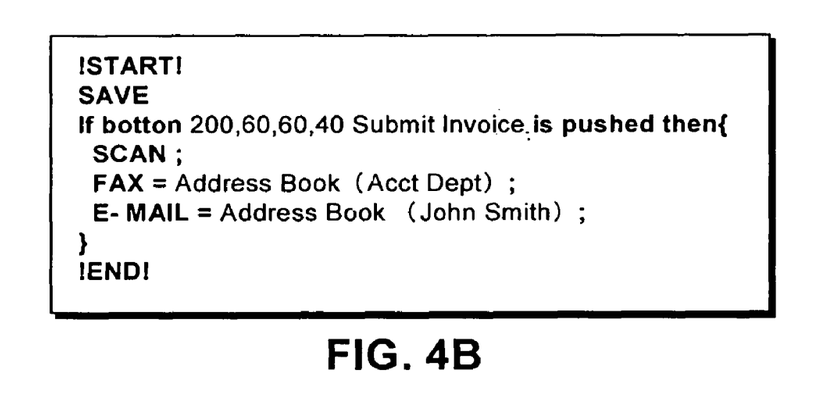
FIG. 4B is a description diagram showing an example of the simple text program.

FIG. 4A illustrates a syntax of the simple text program. FIG. 4B describes an example of the syntax.

In FIG. 4B, "!START!" is a start tag, and "!END!" is an end tag. They indicate an area for the simple text language processing program 39 to process.

"SAVE" below the start tag is a command for the simple text language processing program 39. After recognition of the source code, the command functions to store the source code on the DRAM 13D into the HDD 14.

Written in a conditional statement, which is a type of control string, "button 200, 60, 60, 40 Submit Invoice" is a set of parameters for displaying a button on the operation panel 17. A first set of parameters (200, 60) indicates a highest left coordinate of the button. A first value designates the number of pixels from a left corner of the display screen and a second value designates that from a top of it. A second set of parameters (60, 40) specifies the button size, each indicating a width and a length of the button. The following "Submit Invoice" is a character string to be written on the button.

Figure 4C:
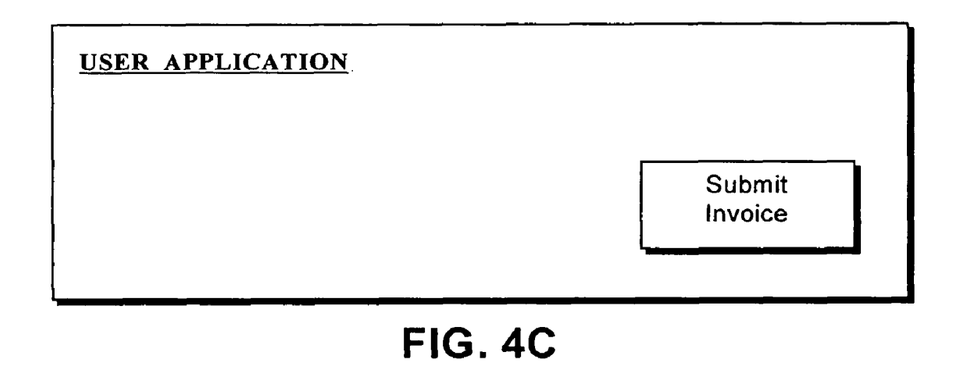
FIG. 4C is a diagram illustrating a screen to be displayed on an operation panel of a preferred embodiment of the present invention through execution of the program.

The conditional statement will displays the button shown in FIG. 4C on the operation panel 17. If the user press the button, the process in "{ }" will be executed in sequence.

More specifically, execution of the command string, "SCAN," will lead to reading of a document image by the scanner 15. Execution of the following command string, "FAX=Address Book (Acct Dept)," will transmit the read image data through the MODEM 18 as FAX data. The recipient number is a FAX number included in an "Acct Dept" field of an address book table.

Execution of the following command, "E-MAIL=Address Book (John Smith)," will send an email to the sender of the FAX as a confirmation receipt. The address for the email to be sent is the email address included in a "John Smith" filed of the address book table.

Figure 5A:
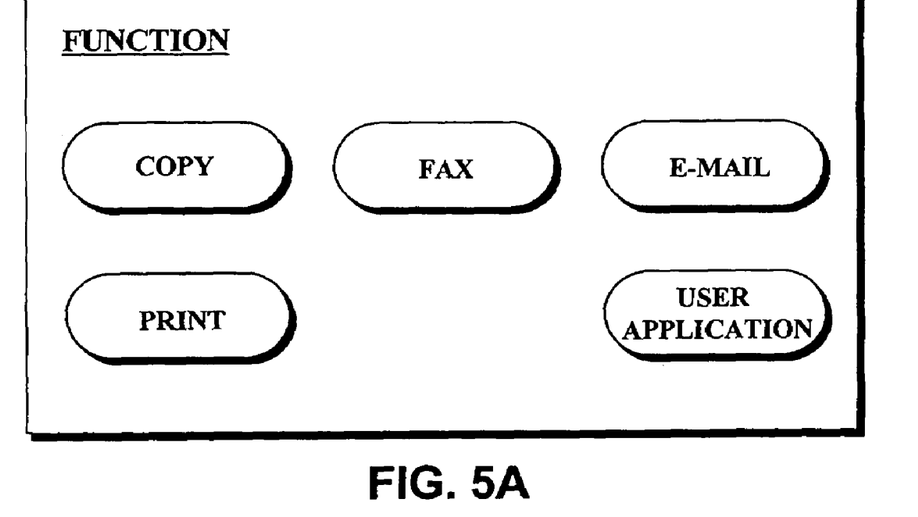
FIG. 5A is a diagram illustrating a main menu screen of a preferred embodiment of the present invention.

FIG. 2 is a schematic flowchart indicating a processing performed by the preprocessing program 38 and the simple text language processing program 39 shown in FIG. 3. The processing is executed by pressing the "USER APPLICATION" button on the operation panel indicated in FIG. 5A, followed by selecting "PAPER" shown in FIG. 5B. Step S0 is performed by the preprocessing program 38. Steps S1 through S6 are performed by the simple text language processing program 39.

The preprocessing program 38 generates a source code by calling the scanner module 331 to direct the MPU 11 to read a document on the document table, then calling the OCR module 339 to direct the MPU 11 to recognize characters included in the document (step S0).

If there are a start and an end tags, operation proceeds to step S2, and if not, proceeds to step S6 (step S1).

If there is the command string, "SAVE," in the source code, the simple text language processing program 39 directs the MPU 11 to store the source code as a file into the HDD 14 through a file system 300 of the OS 30 (steps S 2 and S3).

The simple text language processing program 39 directs the MPU 11 to check syntax validity of each command string between the start and the end tags. If there is a syntax error; operation proceeds to step S6, and if not, proceeds to step S5 (step S4).

The simple text language processing program 39 directs the MPU 11 to interpret each command string in the source code and execute the command by using the appropriate program through the corresponding APIs (step S5).

An error description summary and an error code are displayed on the operation panel 17 to complete the processing (step S6).

Figure 6:
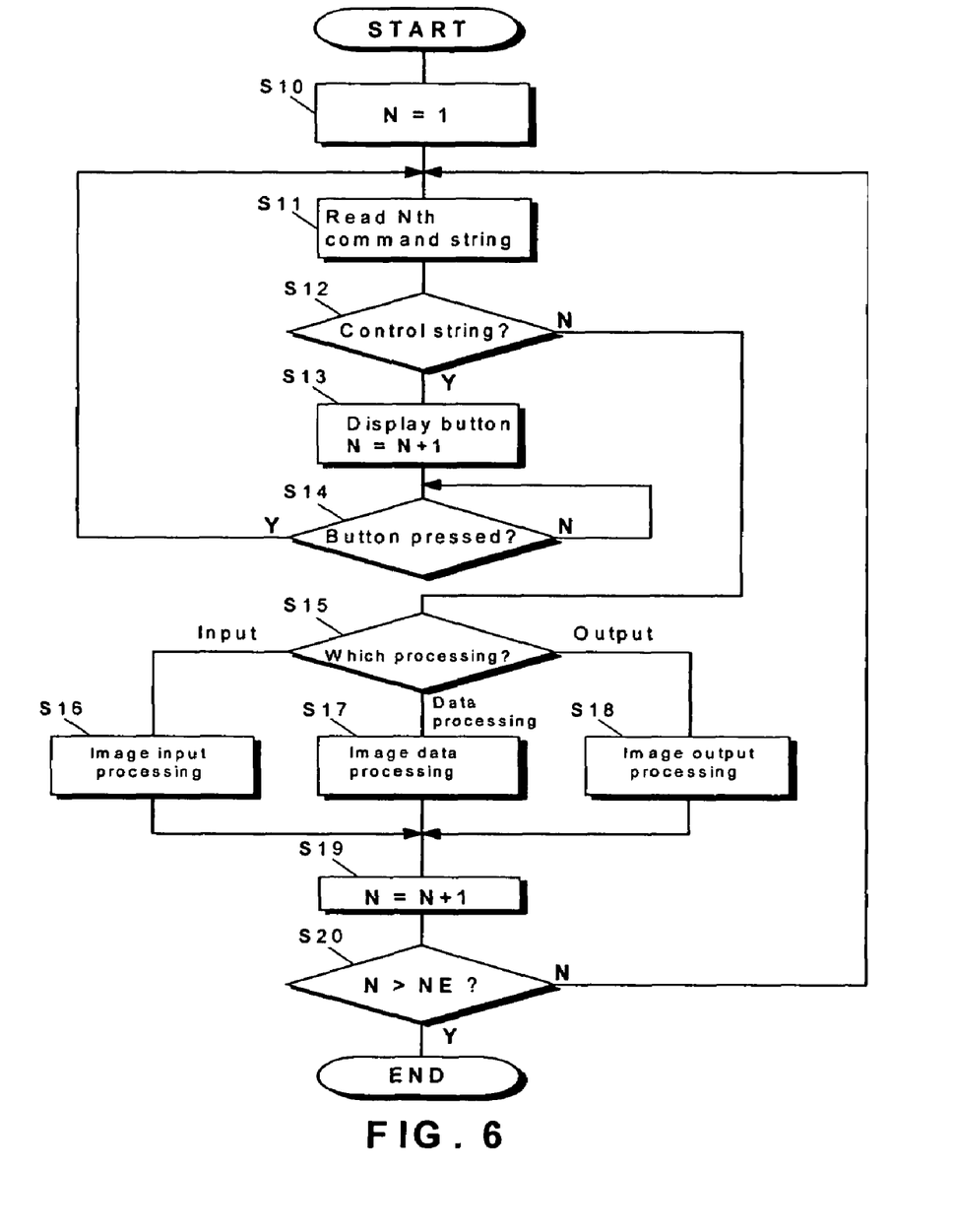
FIG. 6 is a schematic flowchart showing a processing performed, in relation to a processor of an image forming device of the present invention, by the simple text language processing program installed thereon as a user application program for execution of interpretation.

FIG. 6 is a detailed flowchart of step S5.

Assign a default value, "1," to "N." which is a variable for the line number of a command string in order from the beginning to the end in the source code (step S10).

Operation reads a command string on the Nth line in the source code, following the "SAVE" command string (step S 11). A first command string in FIG. 4B is the aforementioned conditional statement as a control string.

If the command string is a control string, operation proceeds to step S113. If not, operation moves to step S15 (step S12).

A button designated as afore-described by the parameter is displayed on the operation panel 17. Additionally, the variable N is incremented by "1" (step S113).

Operation is put on halt until the button being pressed. After the button being pressed, operation returns to step S11. During the wait, a processing for detecting pressing of the button is performed by generation of a timer interrupt, for example, every 20 mille second. Additionally, another time interrupt and other interrupt processings can be performed since a time interrupt enables parallel processing (step S14).

Depending on a type of processing, operation moves to a different step (step S15). If a command string relates to the image input processing, operation moves to step S16 (step S16). If a command string relates to the image data processing, operation proceeds to step S17 (step S17). If a command string relates to the image output processing, operation moves to step S18 (step S18)).

A second command string in FIG. 4B is "SCAN." In this case, the simple text language processing program 39 calls the scanner module 331 in step S16, thereby a document image will be read.

A third command string in FIG. 4B is "FAX=Address Book (Acct Dept)." In this case, the address book module 338 is called with an argument, "Acct Dept," in step S18. Then, the FAX number will be acquired as a return value.

Next, the FAX transmission module 335 is called with the FAX number and a name of the image data acquired with the scanner module 331 as an argument. Thereby, FAX transmission will be executed.

A fourth command string in FIG. 4B is "E-MAIL=Address Book (John Smith)." In step S18, the address book module 338 is called with an argument, "John Smith," and an email address assigned to the value will be acquired as a return value. Then, the email transmission module 336 will be called with another argument, the address and the file name, thereby email transmission will be executed.

The value N is incremented by "1" to proceed step S20 (step S19).

If the value N is larger than the value "NE" (N>NE), the processing will be terminated. If not, operation returns to step S11 (step S20). In FIG. 4B, "NE=4."

Alternatively, instead a source code of the user application on a paper, a file of the source code in the USB memory 20 can also be used.

More specifically, in FIG. 1, the user application can be created at a host PC 21, and the application can be stored in the USB memory 20 by inserting the USB memory 20 into a port 22 of the host PC 21. Eject the USB memory 20 from the port 22, and insert the memory into the USB port 20P of the image forming device 10. Press the "USER APPLICATION" button on the operation panel 17 in FIG. 5A to display the menu shown in FIG. 5B. Select "USB" among other menus. The selection causes to transfer the user application from the USB memory 20 onto the DRAM 13D for processing step S1 and the succeeding steps indicated in FIG. 2 to be executed.

Figure 5B:
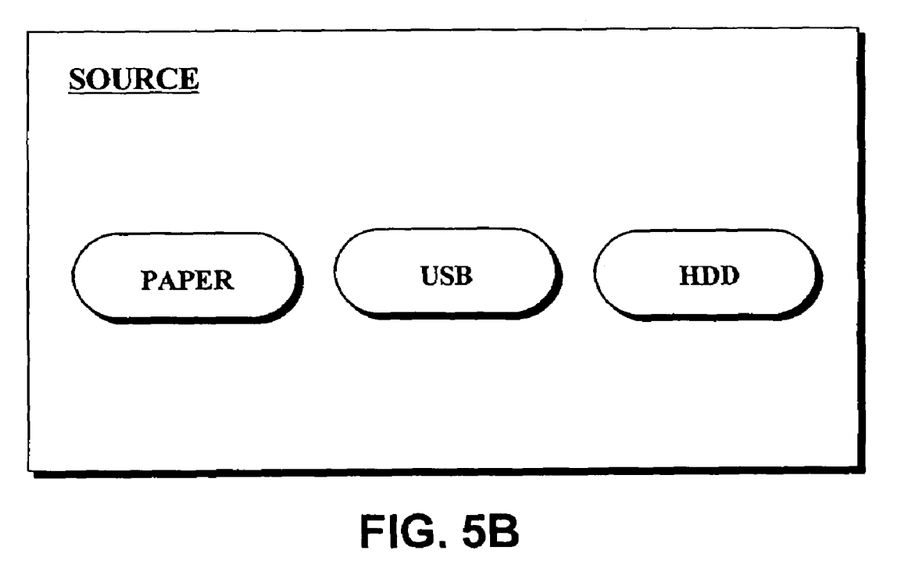
FIG. 5B is a diagram illustrating a menu screen of a preferred embodiment of the present invention to be displayed when a "USER APPLICATION" button of FIG. 3A is pressed.

For using a file in the HDD 14, select a "HDD" menu among others in FIG. 5B.

Likewise, in FIG. 1, the source code of the user application including the start and the end tags can be transferred from the host PC 21 to the NIC 19 of the image forming device 10. In this case too, the user application will be transferred onto the DRAM 13D for processing step S1 and succeeding steps in FIG. 2 to be executed.

According to a preferred embodiment of the present invention, if a command string included in a source code is a control string, a parameter of a button description included in the control string is passed to the operation panel control module 330 as an argument to cause a button to be displayed on the operation panel 17 and pressing of the button to be detected when pressed by the user. In response to the detection, modules among the image input and the image output modules, which correspond to an image input processing command string and an image output processing command string included in the source code, following the control string will be activated. For example, the scanner module 331, the FAX transmission module 335, and the email transmission module 336 will be activated. Accordingly, function modules according to the operation button can be easily combined, thereby more user can easily use the application program.

Additionally, the parameter of the button description includes the position coordinate and the size of a button on the operation panel 17, and therefore, a button of any desired size can be easily placed on a desired location.

Furthermore, activation of the scanner module 331 directs the scanner 15 to read a document image, and the scanner 15 acquires the image data. Then, the OCR module 339 is activated to recognize characters included in the image data, thereby the source code of the application is acquired. Accordingly, the user can easily use a user application solely with the image forming device 10.

Figure 7:
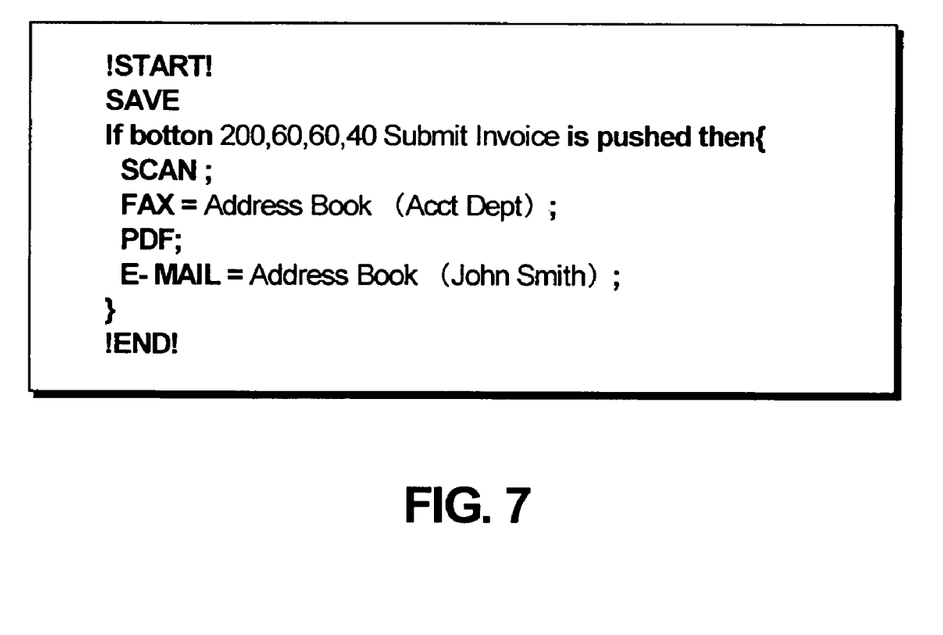
FIG. 7 is a diagram indicating a source code of a user application of a preferred embodiment of the present invention.

FIG. 7 shows a source code of the user application 37 used for an image forming device of another preferred embodiment of the present invention. The program is constituted of the source code of FIG. 4B with a "PDF" command string inserted. In this case, the simple text language processing program 39 calls the data format conversion module 337 to direct it to convert the image data acquired with the scanner module 331 in step S17 of FIG. 6 into a PDF file. Accordingly, the PDF file is transmitted through email.

Furthermore, several other types of configuration can also be applied to the present invention.

For example, the end tag is not essential, so that, for instance, two return codes in sequence can be substituted for the end tag.

Alternatively, multiple application programs can be written to display a plurality of buttons on the display screen shown in FIG. 4C. Yet alternatively, one single application can be written to include multiple pairs of a conditional statement and a processing command string. These configurations enable display of multiple buttons on the display screen shown in FIG. 4C, which allow the users to manage office administration tasks through the single screen.

Furthermore, several other shapes and sizes of icons can be used to represent the buttons to be displayed on the operation panel 17.

The present document incorporates by reference the contents of Japanese priority document, Japanese Patent Application No. 2006-147303, filed in Japan on May 26, 2006.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth. There are changes that may be made without departing from the spirit and scope of the invention.

Any element in a claim that does not explicitly state "means for" performing a specific function, or "step for" performing a specific function, is not to be interpreted as a "means" or "step" clause as specified in 35 U.S.C. 112, Paragraph 6. In particular, the use of "step(s) of" or "method step(s) of" in the claims herein is not intended to invoke the provisions of 35 U.S.C. 112, Paragraph 6.

What is claimed is:

1. An image forming device, comprising:
   a processor;
   a storage unit for storing a program;
   an operation panel;
   an image input unit for reading an image, receiving image data, and storing the image data into a memory area; and
   an image output unit for forming the image on a paper, transmitting the image data, and reading out the image data from the memory area,
   wherein the storage unit, the operation panel, the image input unit, the image output unit are connected to the processor; and
   the image forming device, further comprising:
   a basic service program;
   a simple text language processing program;
   an operation panel control module that directs the processor to display a button on the operation panel and detect pressing of the button when pressed;
   an image input module, including a scanner module, a FAX reception module, and an email reception module, that directs the processor to operate the image input unit to acquire the image data;
   an image output module, including a print module, a FAX transmission module, and an email transmission module, that directs the processor to provide the image data to the image output unit; and
   a data processing module, including data format processing module, that directs the processor to process image data acquired from the image input module and to provide the processing image data with the image output module; and
   wherein the program includes the basic service program and the simple text language processing program, and the basic service program includes the operation panel control module, the image input module, the image output module; and the data processing module, and wherein, upon pressing by a user of a "user application" button, a preprocessing program generates a source code;

if the simple text language processing program detects no start tag and no end tag in the source code, an error description summary and an error code are displayed on the operation panel and the simple text language processing program ends, and if the simple text language processing program detects a start tag and an end tag in the source code, operation proceeds;

if the simple text language processing program detects a command string "save" in the source code, the simple text language processing program directs the processor to store the source code as a file into a hard disk drive through a file system of an operating system;

upon the simple text language processing program directing the processor to check syntax validity of each command string between the start tag and the end tag, if there is a syntax error, an error description summary and an error code are displayed on the operation panel and the simple text language processing program ends, and if there is no syntax error, operation proceeds;

wherein syntax of a simple text program of the source code comprises start tag, control string, image input processing, image data processing, image output processing, and end tag; and while the simple text language processing program directs the processor to interpret each command string in the source code and execute the each command, for a command string included in the source code which is a control string, the parameter of the button description included in the control string is passed to the operation panel control module as an argument, which causes the button to be displayed on the operation panel and the pressing operation of the button to be detected when pressed, and in response to the detection, modules among the image input and the image output modules, which correspond to an image input process command and an image output process command strings included in the source code, following the control string will be activated;

for a command string included in the source code which is not a control string, depending on a type of processing, operation moves to a different step corresponding to each of the syntax of image input processing, image data processing, and image output processing in the syntax of the simple text program comprising start tag, control string, image input processing, image data processing, image output processing, and end tag, and if the command string relates to image input processing, operation moves to image input processing step wherein an image is scanned and read; if the command string relates to the image data processing, operation proceeds to image data processing step wherein data is processed; and if the command string relates to the image output processing, operation moves to image output processing wherein image is output and transmitted.

2. The image forming device of claim 1, further comprising:

an OCR module; and a preprocessing program that activates the image input module to direct the image input unit to read the image and to acquire the image data, and that activates the OCR module to acquire the simple text language processing program by recognizing characters included in the image data, wherein the basic service program include the OCR module, and the program includes the preprocessing program.

3. The image forming device of claim 1, further comprising:

an external storage device connected to the processor, wherein the simple text language processing program stores, if a store command instructing storing into the external storage device is written between the start tag and the end tag, the simple text language processing program between the start tag and the end tag into the external storage device.

4. The image forming device of claim 1, wherein the simple text language processing program directing the processor to interpret each command string in the source code and executing the each command comprises:

using N as a variable for line number of each command string in the source code, assigning 1 to N, incrementing N until reaching the end of the source code, reading and interpreting each command string in the source code, wherein:

if the command is not a control string, and the command designates a button display, a button is displayed on the operation panel according to each parameter of a button description included in the control string to display the button, then operation is put on halt until the button is pressed, using a timer interrupt enabling parallel processing; and if the command is a control string, operation movies to a different step depending on a type of processing, comprising image input processing, scanning, FAX transmission, and email transmission.

5. The image forming device of claim 4, wherein:

the each parameter of the button description includes a position coordinate, a size of the button, and a character string to be written on the button to be displayed on the operation panel.

6. The image forming device of claim 4, wherein after displaying the button on the operation panel according to each parameter of a button description included in the control string to display the button, then operation is put on halt until the button is pressed, during the wait, a processing for detecting pressing of the button is performed by generation of a timer interrupt for repetition by a fixed time interval, and another timer interrupt and other interrupt processing can be performed enabling parallel processing.

7. The image forming device of claim 1, wherein the simple text language processing program directs the MPU to interpret each command string in the source code and execute the command by using the appropriate program through the corresponding APIs;

wherein line number variable N is set to 1, and is incremented after reading and processing each line of command string, until N is larger than the value NE for number of command string lines in the source code; and wherein operation reads a command string on the Nth line in the source code, and a button designated by parameter is displayed on the operation panel, and then operation is put on halt until the button being pressed, and after the button is pressed, operation returns to the above step of reading a command string on the Nth line in the source code; and during the wait, a processing for detecting pressing of the button is performed by generation of a timer interrupt for repetition by a fixed time interval, and another timer interrupt and other interrupt processing can be performed enabling parallel processing.

8. The image forming device of claim 7, wherein for a command string SCAN, the simple text language processing program calls the scanner module, thereby a document image will be read;

for a command string "FAX=Address Book (Acct Dept)", the address book module is called with an argument "Acct Dept", then, FAX number will be acquired as a return value; and then the FAX transmission module is called with the FAX number and a name of the image data acquired with the scanner module as an argument, thereby, FAX transmission will be executed; and for a command string "E-MAIL=Address Book (John Smith)", the address book module is called with an argument "John Smith" and an email address assigned to the value will be acquired as a return value, and then, the email transmission module will be called with another argument, the address and the file name, thereby email transmission will be executed.

9. The image forming device of claim 1, wherein syntax of a simple text program of the source code includes start tag, one control string, one image input processing command, one image data processing command, one image output processing command, and end tag; and while the simple text language processing program directs the processor to interpret each command string in the source code and execute the each command, for a command string included in the source code which is not a control string, depending on a type of processing, operation moves to a different step corresponding to each of the syntax of image input processing, image data processing, and image output processing in the syntax of the simple text program including start tag, one control string, one image input processing command, one image data processing command, one image output processing command, and end tag.

* * * * *